US009648887B2

(12) United States Patent
Thrane et al.

(10) Patent No.: US 9,648,887 B2
(45) Date of Patent: May 16, 2017

(54) GUIDE MEMBER, A GUIDE SYSTEM AND A METHOD FOR SEPARATING A VISCARY SET EVISCERATED FROM SLAUGHTERED POULTRY

(71) Applicant: LINCO FOOD SYSTEMS A/S, Trige (DK)

(72) Inventors: Uffe Thrane, Hammel (DK); Jonas Jensen, Hobro (DK)

(73) Assignee: LINCO FOOD SYSTEMS A/S, Trige (DK)

( * ) Notice: Subject to any disclaimer, the term of this patent is extended or adjusted under 35 U.S.C. 154(b) by 0 days.

(21) Appl. No.: 15/036,940

(22) PCT Filed: Nov. 14, 2014

(86) PCT No.: PCT/DK2014/050390
§ 371 (c)(1),
(2) Date: May 16, 2016

(87) PCT Pub. No.: WO2015/070880
PCT Pub. Date: May 21, 2015

(65) Prior Publication Data
US 2016/0278396 A1    Sep. 29, 2016

(30) Foreign Application Priority Data
Nov. 14, 2013    (DK) .................................. 2013 70684

(51) Int. Cl.
*A22C 21/00*    (2006.01)
*A22C 21/06*    (2006.01)
*A22B 5/00*    (2006.01)

(52) U.S. Cl.
CPC ............ *A22C 21/06* (2013.01); *A22B 5/0005* (2013.01)

(58) Field of Classification Search
USPC ................................ 452/106, 117, 177, 198
See application file for complete search history.

(56) References Cited

U.S. PATENT DOCUMENTS

| 5,755,617 A * | 5/1998 | van Harskamp ...... A22C 17/14 |
| | | 452/106 |
| 6,152,816 A * | 11/2000 | van den |
| | | Nieuwelaar ............ A22C 21/06 |
| | | 198/465.1 |

(Continued)

FOREIGN PATENT DOCUMENTS

| EP | 0 541 150 A1 | 5/1993 |
| EP | 0 587 253 A2 | 3/1994 |

(Continued)

OTHER PUBLICATIONS

International Search Report for PCT/DK2014/050390, dated Jan. 20, 2015.

(Continued)

*Primary Examiner* — Richard Price, Jr.
(74) *Attorney, Agent, or Firm* — FisherBroyles, LLP; Robert Kinberg

(57) ABSTRACT

A guide member for use in separating viscera sets eviscerated from slaughtered poultry comprising a separation support surface having an elongated opening for receiving a viscera set in a manner whereby at least the intestines and the gallbladder are suspended below said guide member and the liver and gizzard are positioned above said guide member. The elongated opening extends away from a front edge of the separation support surface and a distal section of the opening is off-set in relation to a proximal section in a direction substantially parallel to the front edge. A gripping member may be arranged below said guide member for gripping a part of the intestines. In a method according to the invention the guide member is moved into contact with the (Continued)

viscera set whereby the intestines and/or gallbladder enters the elongated opening.

15 Claims, 7 Drawing Sheets

(56) References Cited

U.S. PATENT DOCUMENTS

| | | | |
|---|---|---|---|
| 7,059,953 B2 * | 6/2006 | Jensen ................... | A22C 17/14 452/117 |
| 2003/0148725 A1 * | 8/2003 | Jensen ................... | A22C 17/14 452/117 |
| 2015/0017895 A1 * | 1/2015 | Al-Laham .............. | A22C 17/16 452/106 |

FOREIGN PATENT DOCUMENTS

| | | |
|---|---|---|
| NL | 9201654 A | 4/1994 |
| WO | 00/33661 A1 | 6/2000 |
| WO | 2005/036973 A1 | 4/2005 |

OTHER PUBLICATIONS

Written Opinion for PCT/DK2014/050390, dated Jan. 20, 2015.
Danish Search Report for PA 2013 70684, dated Jun. 4, 2014.

* cited by examiner

GUIDE MEMBER, A GUIDE SYSTEM AND A METHOD FOR SEPARATING A VISCARY SET EVISCERATED FROM SLAUGHTERED POULTRY

BACKGROUND OF THE INVENTION

The present invention relates to a guide member, a guide assembly, a system and a method for separating a viscera set eviscerated from slaughtered poultry.

Viscera separation is an important part of the poultry slaughtering process. The two most important parameters are speed and quality. Modern poultry slaughtering systems are capable of operating at processing speeds of above 200 birds per minute. As the value of the systems is directly proportional with their processing speed, even a small increase in the processing speed may be very valuable. However, an increase in the processing speed should not result in a corresponding decrease in the quality of the separation.

One particular important part of the viscera separation process is the separation between edible and non-edible parts. Typically, the intestines and gallbladder are perceived as non-edible parts, whereas the liver, heart and gizzard are perceived as edible parts. Especially, the separation of the gallbladder from the liver is challenging, as the gallbladder contains bile that may contaminate the edible parts of the viscera set if the separation is not done properly.

WO0033661 discloses a method and an apparatus for separating viscera sets, wherein viscera sets suspended from holders under the influence of gravity are inserted between stationary horizontal guide plates in such a way that the proventriculus, gizzard, heart, lung and liver are disposed over the guide plates, and that the intestine pack including the gallbladder is disposed at the underside of the guide plates. The intestine pack is clamped between clip brackets rotating about a reversing wheel. The clip brackets are successively displaced downward for exerting a downward directed pull in the intestine pack while the intestine pack passes by a rotating cutter, cutting free the intestine pack. The remaining parts of the viscera set, including proventriculus, gizzard, heart, lungs and liver, are passed on to a second apparatus for further separation.

In some cases, however, a part of the liver is pulled below the stationary guide plates, where it will be cut off and discarded together with the gallbladder and the intestines, and in other cases the gallbladder is either punctured or not separated from the liver. This is particularly the case when the natural variations in the different parts of the viscera set are relatively high.

Thus, it remains a problem to provide a method and/or system allowing a more precise separation at high processing speeds of viscera sets suspended from viscera holders, where the intestines and gallbladder are separated from the remaining viscera set.

SUMMARY OF THE INVENTION

According to a first aspect, the invention relates to a guide member for use in a system for separating viscera sets eviscerated from slaughtered poultry, the guide member comprising a separation support surface having an elongated opening for receiving a viscera set in a manner whereby at least the intestines and the gallbladder are suspended below the guide member and the liver and gizzard are positioned above the guide member, wherein a front edge of the guide member is adapted for first coming into contact with the viscera set, and wherein the elongated opening is provided in and extending away from a front edge of the separation support surface, the elongated opening having a proximal section located at the front edge and a distal section located away from the front edge, the distal section of the opening being off-set in relation to the proximal section in a direction substantially parallel to the front edge. The off-set sections of the elongated opening cause viscera sets not already properly orientated to turn when being arranged in the opening so that the viscera sets come to hang in a more well-defined manner, thus allowing the gallbladder and intestines to be separated more precisely from the remaining viscera set.

The elongated opening may be of a substantially straight configuration and extending in an angle different from 90 degrees away from the front edge. It has, however, been shown to be advantageous that at least one of two side edges delimiting the elongated opening is/are curved or bent in a plane defined by the separation support surface, so that the elongated opening also appear curved or bent. In one embodiment, the proximal and distal sections of the elongated opening are substantially perpendicular to the front edge and interconnected by an intermediate inclined section, which is arranged at an angle of 10-80, more preferred 20-60 and still more preferred approximately 40 degrees to the front edge. The side edges of the inclined section are presently preferred to be non-parallel with a mutual angle of 3-10 degrees, preferably approximately 5 degrees. Side edges of the proximal and/or distal section may also be arranged at different angles, which may particularly be relevant if using an elongated opening without an inclined intermediate section.

The width of the elongated opening in a guide member intended for processing viscera sets from chicken is advantageously between 5 mm and 30 mm. The proximal section of the opening then preferably has a width of 10-15 mm, still more preferred 13-14 mm, while the optimal width of the distal section will depend on whether the spleen is to be removed together with the intestines and the gallbladder or kept with the liver and gizzard. If wishing to remove the spleen from a chicken viscera set, the distal section of the opening should have a width of 20-30, preferably 24-26 mm, and if wishing to keep the spleen the width should be approximately the same as the width of the proximal section. The optimal mutual angle of the side edges of an inclined section of the elongated opening may also depend on whether the spleen is to be removed or not.

The side edge of the elongated opening as well as the front edge are preferably rounded to avoid damages to the intestines, gallbladder and other part of the viscera set, and bevelling of the edges may even contribute to a more precise positioning of the viscera set in relation to the guide member.

In some embodiments, the guide member comprises two parts, which are movable in relation to each other. When using such a two-part guide member, the two parts are preferably moveable between a first open position, wherein the guide member is configured to receive the viscera set and wherein the two parts are relatively far apart, and a second closed position, wherein the two parts are close to each other. When being moved from the open position to the closed position, one or both parts are moving in a horizontal or inclined direction, so as to engage the hanging viscera set from the sides, i.e. in a transverse direction with respect to the extent of the intestines when hanging from the viscera holder. This allows the guide member to be arranged around the viscera set, so that it is arranged in the elongated opening with minimal friction. One or more recesses in one or both parts of a two-part guide member may form the elongated opening when the guide member is brought into the second position.

In some embodiments, the front edge and/or side edges of the guide member is/are provided with flanges extending upwards from the separation support surface and adapted for keeping particular the liver in place on the separation support surface.

It is of course possible to move the viscera set for bringing it into contact with the guide member, while holding the guide member substantially still, but the guide member may also be moveable between an inactive position and an active position.

In one embodiment, the separation support surface is substantially vertical in the inactive position and substantially horizontal in the active position. For being able to move between these two positions, or between other positions where the guide member is not horizontal or vertical, the guide member in some embodiments is able to pivot about an axis, which is substantially perpendicular to the elongated opening and/or parallel to the front edge. Alternatively or as a supplement, the guide member may be vertically movably arranged. In some embodiments a vertical movement may be used for moving the guide member between a first vertical position and a second vertical position above the first vertical position. The first vertical position is preferably adapted for receiving a viscera set and the second vertical position for supporting at least the liver during separation of the viscera set. In a system according to the invention, the guide member and the viscera holder may be arranged with a first distance, where the guide member is adapted for receiving the viscera set, and with a second distance, where the liver may rest on a separation support surface of the guide member, the second distance being smaller than the first distance. This may be achieved by allowing the viscera holder to move downwards and/or by allowing the guide member to move upwards, but it will often be preferred that the viscera holder is adapted for moving substantially in a horizontal plane and that the guide member is adapted for being moved upwards towards the viscera holder. It should be understood that the movement from the first vertical position to the second vertical position does not have to be exactly vertical but may include a horizontal component, such that the guide member is moved along an inclined path from a lower position to the side of the viscera holder to a higher position directly below the viscera holder.

Whenever reference is made to a member being "substantially vertical" or "substantially horizontal" this is to be understood only as a general indication of direction. This for example means that when the guide member is described as being "substantially horizontal" in its active position it is to be understood as meaning that it should be able to form a supporting surface for the liver and gizzard. Likewise the "substantially vertical" inactive position is to be understood as a position, where the guide member has been swung away and arranged in a position, where any liquid on the support surface will run off.

The term "rests" is not to be understood in the very strict sense that the liver is absolutely stationary in relation to the separation support surface. Some movement may be involved due to the very high processing speeds in modern poultry processing. To avoid damage to the viscera set, particularly the liver, it is, however, preferred that the movement is limited so that the relative velocity of the liver in relation to the separation support surface is less than 25%, preferably less than 10%, of the velocity of the viscera holder.

According to a second aspect, the invention relates to a guide assembly comprising a guide member as described above and a gripping member arranged below the guide member for gripping a part of the intestines. The gripping member is adapted for gripping a part of the intestines and fixating them during operation of the guide member, thereby contributing to the viscera set being arranged correctly in the elongated opening of the guide member. The gripping may simply fixate the intestines so that an upwards movement of the guide member causes a stretching of the intestines, but in some embodiments, the gripping member is configured to perform a relative downwards translation and pull the intestines further through the elongated opening of the guide member, i.e. adapted for being vertically and possibly also horizontally translated relative to the viscera holder to inflict an active pull on the intestines.

In some embodiments, the gripping member is translated relative to the viscera holder in a manner whereby the intestines positioned between the gripping member and the guide member are arranged along an axis being approximately parallel with a normal vector of the separation support surface, i.e. perpendicular to the separation support surface. This provides the largest possible distance between the liver and the gallbladder, thus allowing the separation to be performed even more precisely.

The gripping member may be translated relative to the viscera holder in two or more steps, possibly even in an oscillating manner. It is also possible that the gripping member releases the intestines after a first downward translation, grips a second part of the intestines and performs a second downward translation, whereby the intestines are pulled further through the elongated opening of the guide member. To achieve movements of the gripping member as described above it may be translated horizontally and/or vertically and/or swung.

In one embodiment, the gripping member first grips the intestines while the guide member is in its inactive position, possibly pulling them somewhat downwards, and holds on to them during the movement of the guide member towards its active position. In this way the viscera set is kept in a relatively well-defined position when being arranged in the elongated opening. Once the guide member is in its active position, the gripping member pulls downwards on the intestines in order to pull them entirely through the elongated opening and also pulling the gallbladder out, so that it is exposed on the underside of the guide member.

Possibly, the gripping member is configured to be moved in a manner whereby the intestines positioned between the gripping member and the guide member are arranged along an axis being approximately parallel with a normal vector of the separation support surface.

In some embodiments, the guide assembly further comprises an assembly frame on which the guide member and/or the gripping member are arranged, and a movement of the gripping member and/or the guide member may then be provided by displacing them on the assembly frame. For this purpose the assembly frame may comprise a pair of rods serving to guide an upwards or downwards movement of members attached thereto.

By arranging the guide member and the gripping member on a common assembly frame, their movements may be easily coordinated or synchronized. A guide assembly comprising an assembly frame with a guide member and possibly a gripping member mounted thereon may be supplied and replaced as a unit, making the construction of a system according to the invention as well as maintenance and repair relatively easy. This is particularly so if members connecting the guide assembly to an apparatus frame, such as control members adapted for cooperating with guide tracks or the like on the apparatus frame, are made in a manner already known from other systems used in poultry slaughter houses.

A system according to the invention may include several such assembly frames arranged on an apparatus frame, preferably in a movable manner and/or a plurality of gripping members and/or a plurality of guide members, each assembly frame and/or each gripping member and/or guide member preferably being adapted for moving with a particular viscera holder. In this way each guide member and/or gripping member and/or assembly frame can be configured to move with a viscera holder as a pair at least over a distance by having an approximately equal velocity in the horizontal plane i.e. they may move closer to each other or further away from each other, but they will approximately follow each other when viewed from above. This contributes to preventing damages to the viscera set caused by impacts between a moving viscera set and a stationary part of the system or vice versa and allows a continuous process. Two or more gripping members may be adapted each for moving with a particular viscera holder and grip a first part of the intestines, while the guide member is held in an inactive position.

The guide member and/or the gripping member may be provided with control members adapted for running in stationary guide tracks on an apparatus frame.

Above, the mutual arrangement of the sections of the elongated opening of the guide member and the orientation of its pivot axis has been defined with reference to the front edge of the guide member. If the front edge is not straight, it is to be understood that these references are to a tangent to the front edge at the opening. In most embodiments the front edge will be parallel to axis of rotation of the guide member, meaning that if nothing else is stated, angles and orientations defined with reference to the front edge are the same with reference to the axis of rotation, though possibly mirror inverted. Likewise it is to be understood that the presence of flanges at the front edge does not influence its orientation and that the front edge is thus to be understood as the outer boundary of the guide member at level with the separation support surface.

According to a third aspect, the invention relates to a method for separating a viscera set eviscerated from slaughtered poultry and held by a viscera holder on a viscera conveyer in manner whereby at least the liver, the intestines and the gallbladder are suspended below the viscera holder, the method comprising the steps of:

arranging the viscera set in an elongated opening of a guide member in a manner whereby the intestines and the gallbladder are suspended below the guide member and the liver and gizzard are positioned above the guide member; and separating the intestines and the gallbladder from the remaining viscera set, wherein the guide member is moved during one or both of the above steps, wherein the movement of the guide member causes the intestines and/or gallbladder to first enter a proximal section of the elongated opening located at a front edge of the guide member and then enter a distal section located away from the front edge, the distal section of the opening being off-set in relation to the proximal section in a direction substantially parallel to the front edge, and wherein the intestines and the gallbladder are separated from the rest of the viscera set while at least the liver rests on a separation support surface of the guide member.

The step of arranging the viscera set in the elongated opening of the guide member may comprise arranging the viscera holder at a first distance above the guide member and moving the guide member and/or the viscera holder so that they are arranged with a second distance, smaller than the first distance, whereby the liver and gizzard are supported by a separation support surface of the guide member. In some embodiments, the guide member is pivoted into engagement with the intestines. Such a pivoting or swinging of the guide member and hence the separation support surface allows the liver and gizzard to slide towards the lower end of the elongated opening, which may contribute to the gallbladder and possibly the spleen coming out of the opening on the underside of the guide member. The pivoting in combination with the off-set sections of the elongated opening may also cause the viscera set to turn from an initial more or less random orientation to being oriented in a manner allowing the gallbladder and intestines to be separated more precisely from the remaining viscera set, even at high processing speeds. Thereby the amount of liver tissue, which is being discarded, and the risk of contamination caused by cuts in the gallbladder are reduced.

In some embodiments the guide member and the viscera holder are moved together by keeping the viscera holder substantially in the same horizontal plane and moving the guide member upwards. Likewise, the guide member may be moved together with a viscera holder as a pair at least over a distance.

To achieve a precise positioning of the viscera set and prevent it from moving away from the guide member instead of coming into the elongated opening, the intestines may be gripped by a gripping member before or simultaneously with the step of arranging the viscera set in the elongated opening of the guide member. The gripping member may perform one or more substantially vertical movements to pull the intestines and/or gallbladder and/or spleen down through the elongated opening of the guide member.

The intestines and the gallbladder and possibly the spleen may be separated from the remaining viscera set by a blade positioned below the guide member by edges of the elongated opening of the guide member being moved together like scissors and/or by a pull on the intestines.

In a further embodiment the method comprises the following sequence of steps:

gripping the intestines using a gripping member, pivoting the guide member to arrange the viscera set in the elongated opening of the guide member, separating the intestines from the gizzard, forcing the gallbladder downwards in relation to the guide member by increasing the distance between the gripping member and the guide member, separating the gallbladder from the parts of the viscera set arranged on the separating support surface.

The separating steps may be performed using the same blade, but to allow a continuous process, where the guide assembly is continuously advanced together with a viscera holder running on a conveyor, it may be advantageous to use two blades or like separation units. The two separation steps need not be performed in the same way.

First separating the intestines and other tissue surrounding the connection between the intestines and the gizzard allows the gallbladder, which is normally partially surrounded by liver tissue, to be pulled further down and thus pulled away from the liver, possibly pulling the liver slightly through the elongated opening. This allows the entire gallbladder to be removed and the potential removal of a small amount of liver tissue from some viscera sets is considered acceptable compared to the alternative that the gallbladders are not removed entirely and thus ruptured.

It is noted that the use of a two-stage cutting process, where the intestines and the gallbladder are loosened in separate process steps as described above, will also be advantageous when using a guide member not having off-set proximal and distal sections.

In some embodiments, at least one organ, such as the heart, the lungs or the gizzard, is removed from the viscera set before the intestines and the gallbladder are separated and/or the spleen is separated together with the intestines and the gallbladder.

In some embodiments, the movements of the guide member and/or gripping member is controlled by control members fixed thereon and running in stationary guide tracks, which may be provided on an apparatus frame.

The different aspects of the present invention can be implemented in different ways including methods and systems for separating viscera sets, and a guide assembly that may be used in such systems/methods as described above and in the following. Each of these embodiments yield one or more of the benefits and advantages described in connection with at least one of the aspects described above and/or disclosed in the dependent claims. Furthermore, it will be appreciated that embodiments described in connection with one of the aspects described herein may equally be applied to the other aspects.

BRIEF DESCRIPTION OF THE DRAWINGS

In the following, the invention will be described in closer detail with reference to embodiments shown in the drawing, where.

DETAILED DESCRIPTION OF THE INVENTION

Figure 1:
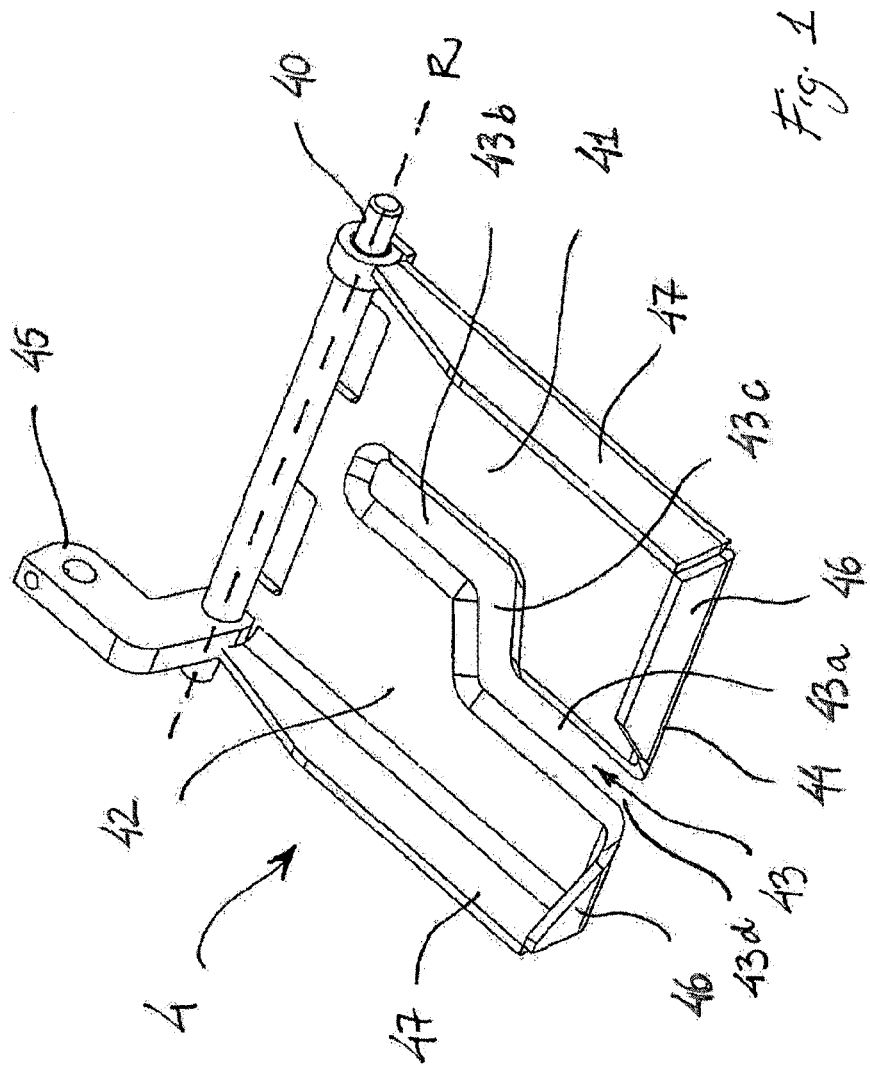
FIG. 1 shows a guide member in a perspective view.

A guide member 4 according to an embodiment of the invention is shown in FIG. 1. It comprises a separation support surface 41, 42 intended for supporting at least the liver and gizzard of a viscera set as will described later. The right-hand side 41 of the separation support surface is intended for supporting primarily the gizzard and the left-hand side is intended for supporting primarily the liver. An elongated opening 43 extending from the front edge 44 of the guide member delimits the two sides 41, 42 of the separation support surface and is intended for surrounding the intestines of the viscera set as will also be described later.

The elongated opening 43 in the embodiment in FIG. 1 includes three sections, a proximal section 43a located at the front edge 44 of the guide member, a distal section 43b located away from the front edge and an intermediate inclined section 43c interconnecting the proximal and distal sections. The distal section 43b of this embodiment, which is intended for processing chicken viscera sets, is located to the right of the proximal section when seen from the front edge and from above and centered between the side edges. In other words the proximal section and the opening 43d of the elongated opening 43 into the front edge 44 is located to the left of the middle of the front edge. This has been shown to provide an optimal positioning of the viscera set in relation to the guide member when processing viscera sets from chicken using an eviscerating apparatus of the type described in WO98/44806. It will, however, be understood that if the viscera sets are eviscerated in a manner, which causes the viscera sets to have a different orientation, it may be advantageous for the opening to be arranged to the right of the middle.

As is well known to the skilled person, viscera sets from birds are relatively uniform apart from size variations, but as particularly the liver tissue is soft it will not be possible to keep it entirely on one side of the separation support surface. Moreover, a small percentage of birds are anatomically different in the sense that the organs are located at the opposite side of the body cavity compared to normal birds of the same species. In such cases the position of the organs in the eviscerated viscera set hanging in the viscera holder will also be mirror inverted in comparison to what will be shown and described here. In most cases the present invention will, however, be able to handle such viscera set, even though the gizzard and liver are lying on the opposite sides of separation support surface. Likewise it will be understood that the organs in some species of birds may be located slightly different in the viscera set than what is shown in the drawing, which depicts viscera sets from chicken. The relative positions and dimensions described herein may therefore have to be adapted for the particular processing.

The guide member 4 in FIG. 1 is substantially square, but it may also be slightly wedge-shaped and most narrow at the end facing away from the front edge to help the viscera set to reach the desired orientation on the separation support surface and/or convex or concave.

Edge flanges 46, 47 are provided at the front edge and at the side edges extending away from the front edge. These flanges are intended to prevent unintentional damage to the liver by preventing particularly the lobes of the liver from hanging over the edges. Here the height of the front edge flanges 46 decreases towards the elongated opening 43 to facilitate the insertion of the intestines into the opening and the side edge flanges 47 are lower towards the back of the guide member to make room for operation of the guide member, but different embodiments of the flanges are possible and may even be advantageous.

In the embodiment in FIG. 1 the proximal section 43a has parallel side edges and a width of 10 mm, the intermediate section 43c has a mutual angle of 4.6 degrees between the side edges, and the distal section 43b has parallel side edges at a mutual distance of 12 mm. This embodiment is intended for processes where the spleen is kept with the liver and gizzard and should therefore remain on the separation support surface 41, 42. If the spleen is to be removed together with the intestines and gallbladder the width of the distal section 43b and possibly also the intermediate section 43c should be somewhat larger. Presently a width of the distal section of approximately 25 mm is considered advantageous for this purpose.

Opposite the front edge 44 in FIG. 1 is an axle 40 intended for defining a rotation axis R when connected to a guide assembly or apparatus frame. An arm 45 is adapted for connection to an activation mechanism pulling and/or pushing on the arm so that the guide member rotates about the axis R.

The guide member 4 in FIG. 1 is shown as being made from a single piece of sheet metal, such as stainless steel, bent to shape, but it will be understood that it may be made from different material and/or by welding or by drawing, or in any other way resulting in a guide member, which is suitable for use in food industry.

The guide member may also be composed of two mutually moveable parts each forming a side 41, 42 of the separation support surface. The elongated opening 43 may then be formed by each part having a recess in the side facing the other part, or only one part may include a recess.

Figure 2:
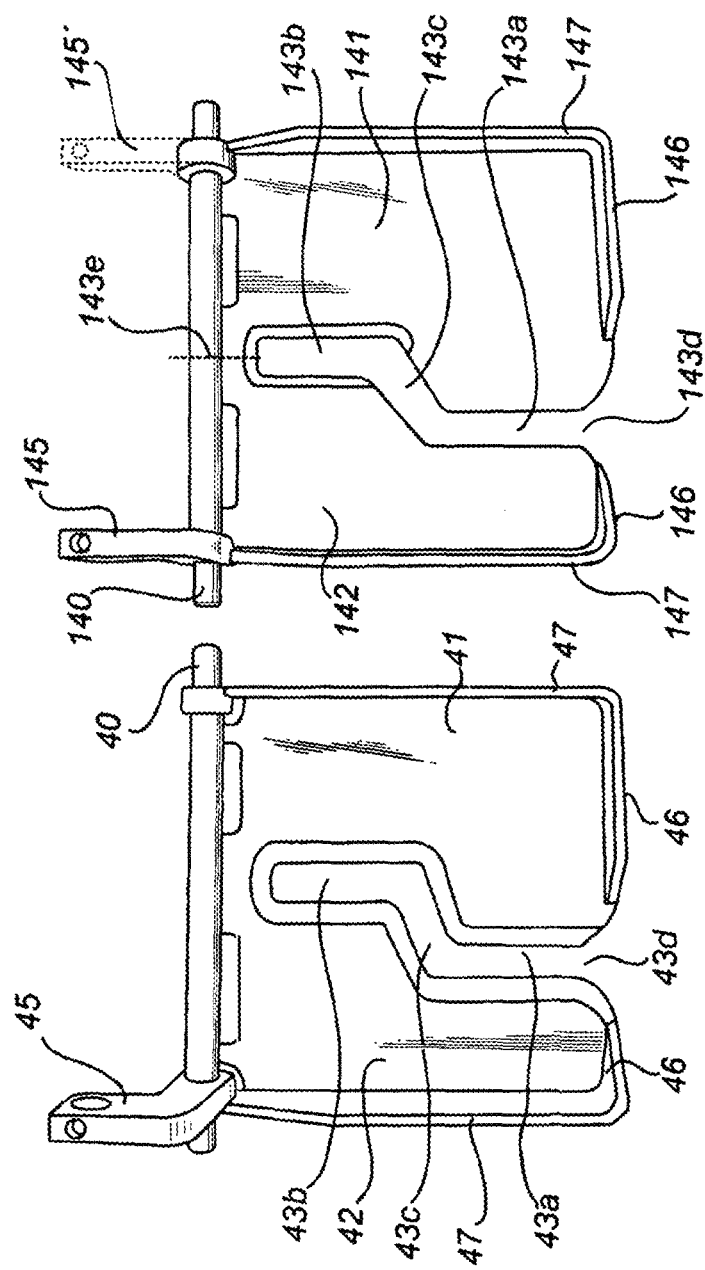
FIG. 2 shows on the left a view from above of a guide member as in FIG. 1 and on the right a view from above of a guide member with a differently shaped elongated opening.

FIG. 2 is a view of a second embodiment of a guide member 104 next to a guide member corresponding to the one in FIG. 1. The second embodiment is provided with reference numbers corresponding to those used in FIG. 1 but with 100 added to the reference numbers shown in FIG. 1. Where nothing else is stated, the respective features have the same design and function as those in FIG. 1.

As may be seen, the second embodiment differs in the shape of the elongated opening. Where all side edges of the opening 43 in the first embodiment are bevelled, only the side edges of the distal section 143b and the side edge of the intermediate section 143c of the elongated opening 143 of the second embodiment are bevelled. Furthermore, the angle between side edges of the intermediate inclined section 143c is larger than the corresponding angle in the first embodiment. Though these differences may appear minor, their small contributions to the insertion of the viscera set will make a difference. As an example, when processing chicken viscera sets it is accepted in some countries that a small section of the outer wall of the gallbladder if left on the liver in order to avoid the loss of liver tissue, but in other countries this is not accepted, and it has been found that a 0.5 mm difference in width of the distal section of the elongated opening will allow to meet such different requirements. Also small differences in the anatomy of different breeds of birds bred in different countries or regions may result in a need for such small adaptations. It may even be advantageous to have several different sets of guide members or adaptor pieces for guide members, so that the system can quickly be adapted for different requirements.

To the right in FIG. 2 the possibility for using a guide member comprising two parts, which are movable in relation to each other, has been indicated in broken lines. A division 143e between the two parts 141, 142 is provided in continuation of the elongated opening 143 and the two parts can be moved away from each other by pulling on the respective arms 145, 145' in opposite directions. The elongated opening 143 may then be seen as being formed by recesses in the two parts 141, 142 of the guide member. In such a two-part embodiment the width of the elongated opening may be made wider by not allowing the two parts to come entirely together in the closed active position.

Figure 3:
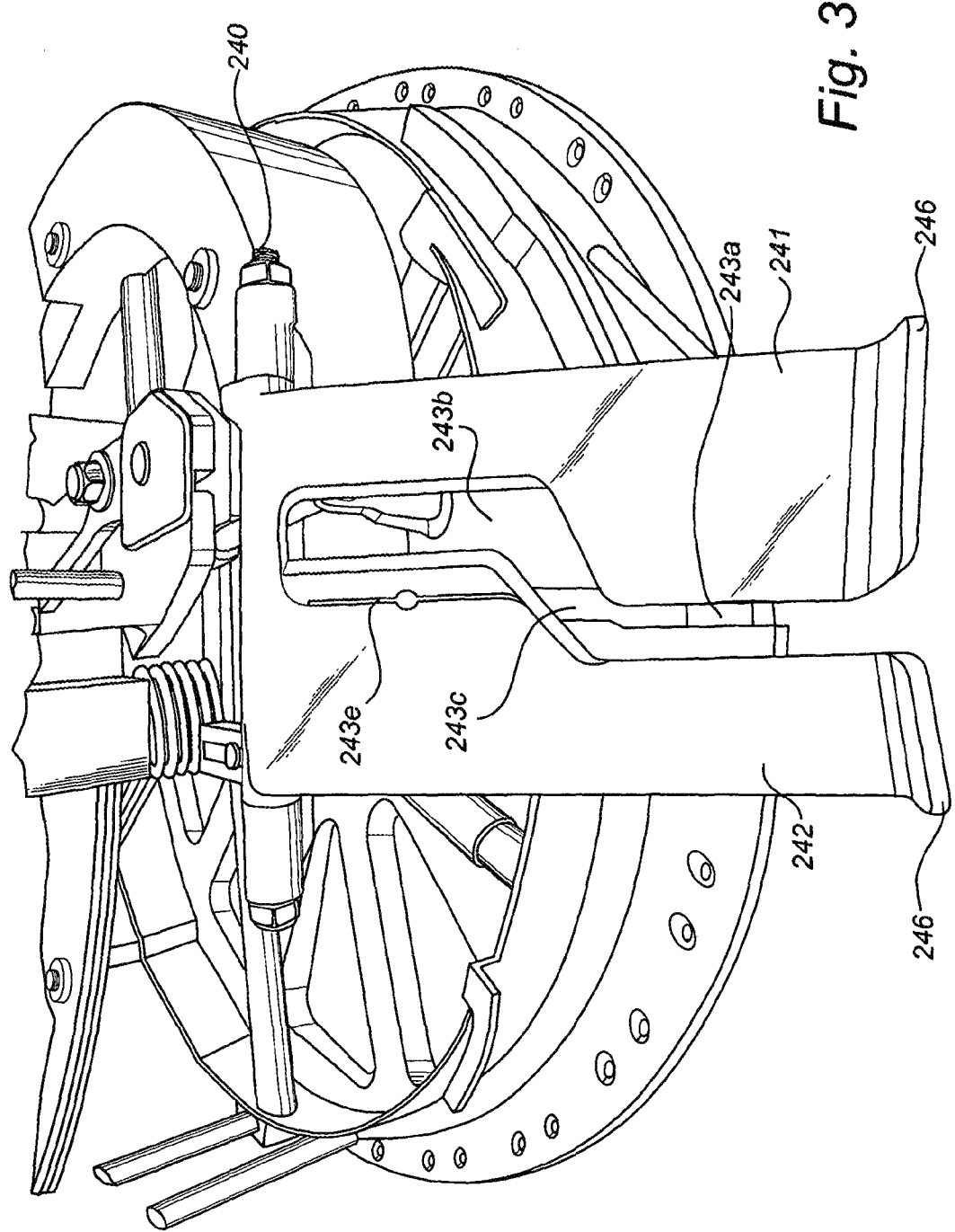
FIG. 3 is a perspective view of still another embodiment of a guide member forming part of a system for separating viscera sets.

FIG. 3 is a view of a third embodiment of a guide member 204 provided with reference numbers corresponding to those used in FIGS. 1 and 2, but with 200 added to the reference numbers in FIG. 1. Thus, for example, parts 240, 241, 242, 243a and 246 in FIG. 3, correspond to like parts 40, 41, 42, 43a and 46, respectively in FIG. 1. Where nothing else is stated, the respective features have the same design and function as those in FIGS. 1 and 2.

The guide member in this embodiment is without side edge flanges and not quite as wide as the ones in FIGS. 1 and 2. This guide member is suited amongst other things for smaller livers, where the risk of the liver lobes coming to hang out over the side edges of the guide member is low.

The elongated opening 243 corresponds in shape to that 143 of the second embodiment, but the outlines 243e of a larger opening suitable for removal of the spleen together with the intestines and gallbladder are seen. Using the larger opening 243c and 243e will cause the spleen to fall through the opening whereby the spleen will be removed together with the intestines and gallbladder.

Figure 4:
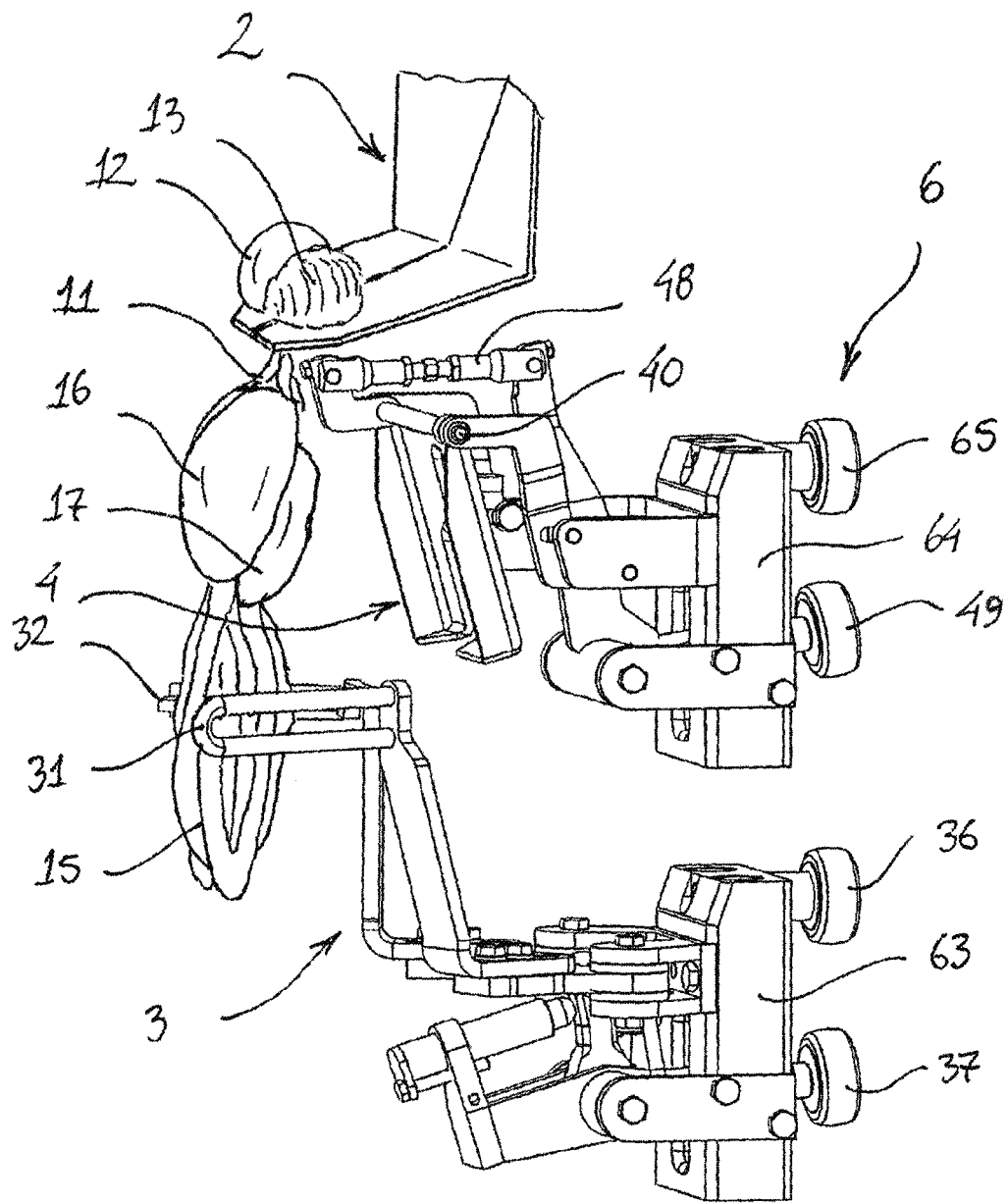
FIG. 4 is a perspective view of a guide assembly for separating poultry viscera sets and engaging a viscera set with the guide member shown in an inactive position.

Turning now to FIG. 4, the guide member 4 is shown as part of a guide assembly 6 and arranged underneath a viscera holder 2, which may be part of an overhead viscera conveyor in a manner well known to the skilled person.

Figure 5:
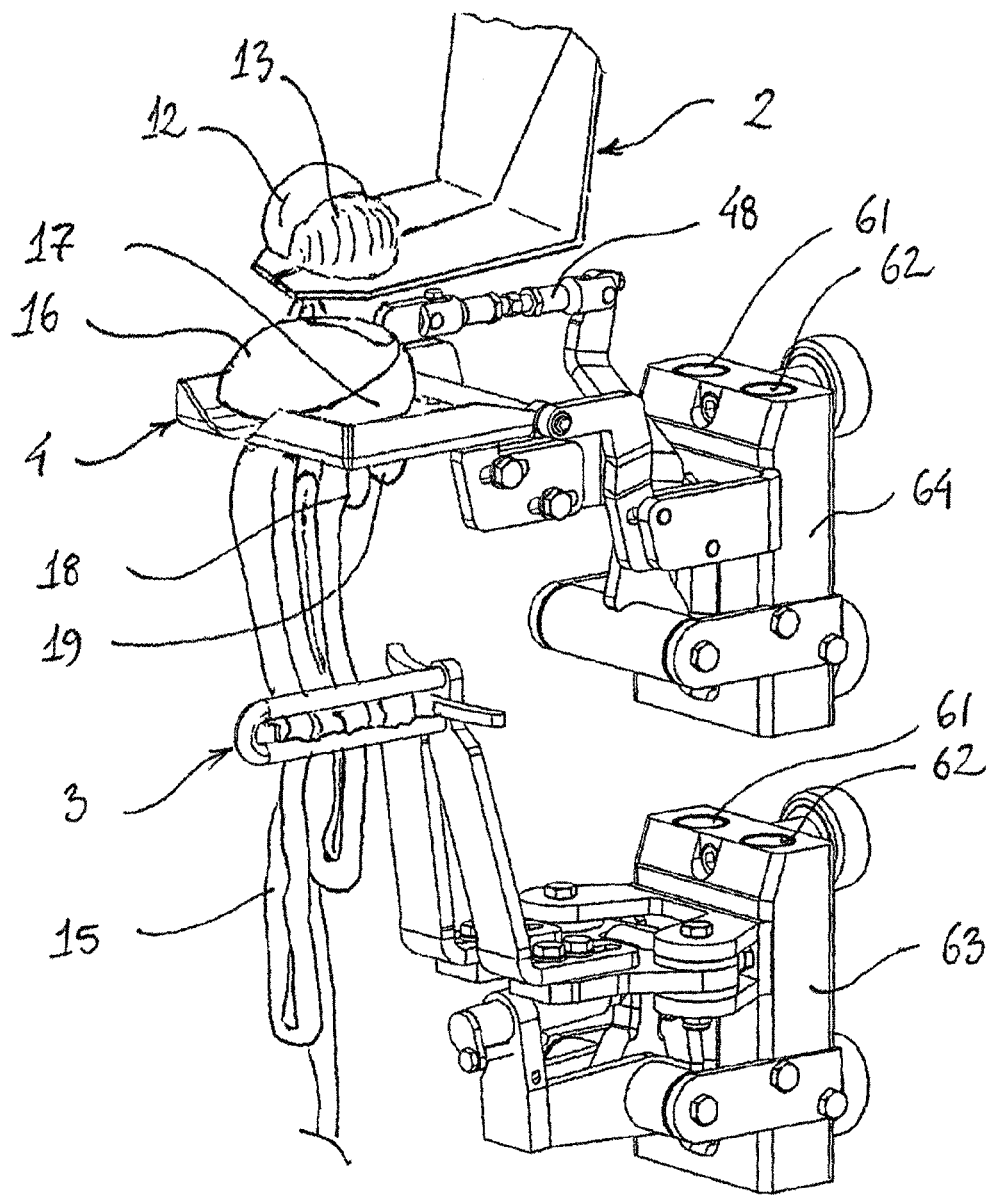
FIG. 5 shows the guide assembly in FIG. 4 with the guide member in an active position and from a slightly different angle, FIG. 6 corresponds to FIG. 5 but seen from the opposite side and from below and also showing a blade intended for separating parts of the viscera set.
Figure 6:
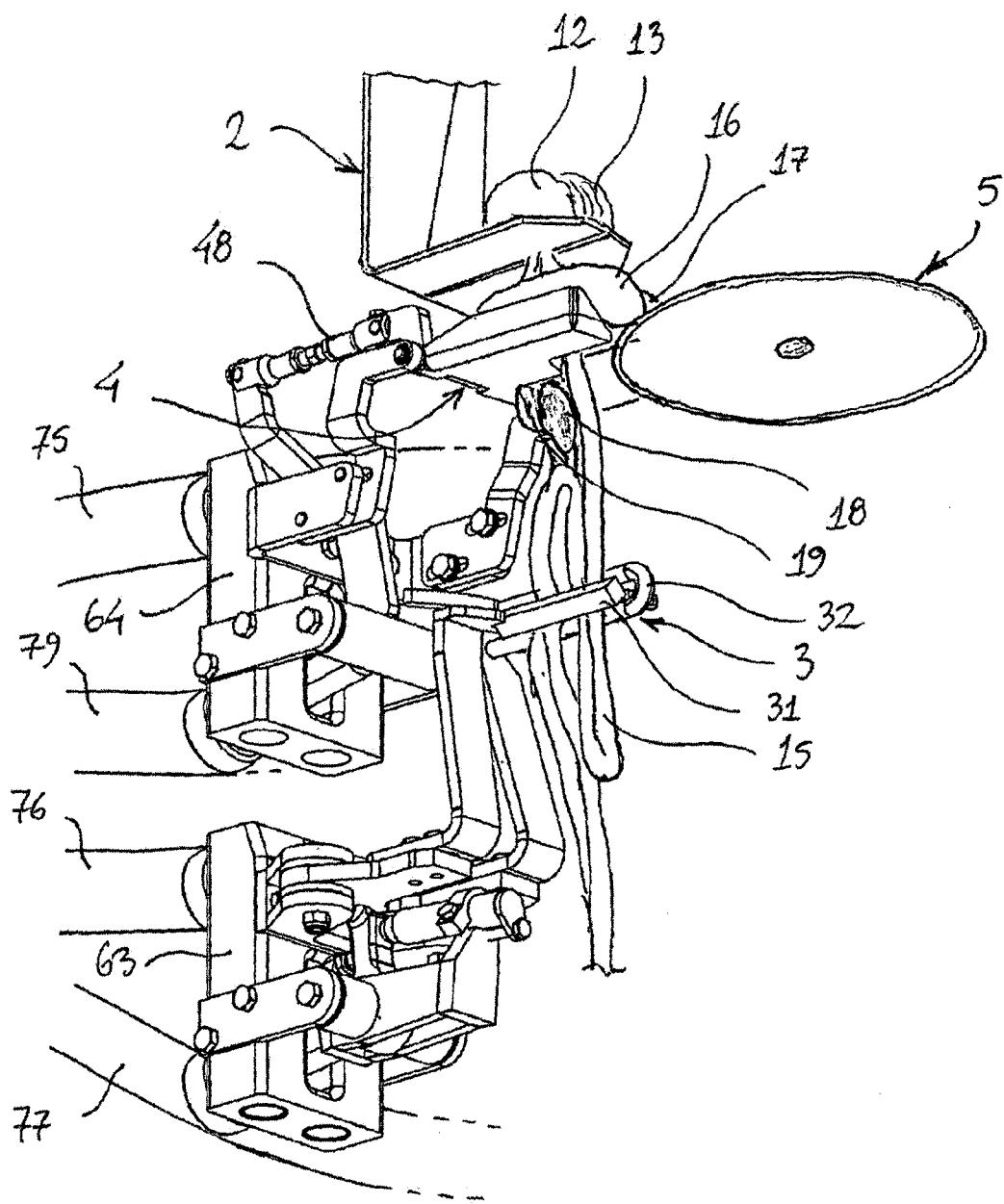

A viscera set from a chicken is shown hanging from the viscera holder 2 in FIGS. 4-6. In this case the viscera holder is of the type with two mutually moveable parts and has gripped the esophagus 11 below the heart 12, so that the heart and the lungs 13 are lying on an upper surface 21 (see FIG. 5) of the viscera holder, but the invention works equally well when the esophagus is held between the heart 12 and the crop. Likewise it is to be understood that the viscera holder does not have to clamp the esophagus. It is also noted that though a chicken viscera set is here used as an example, viscera sets from other birds such as ducks, geese, turkeys, pigeons or quails may be held and processed in substantially the same manner.

In the preferred embodiment a series of viscera holders 2 are mounted on an overhead conveyor as is common practice in poultry slaughterhouses and receiving one viscera set at a time, either directly from an eviscerator or from an intermediate unit or conveyor, which may for example serve as a buffer.

In FIG. 4 a gripping member 3 has been arranged at the intestines 15, while the guide member 4 is kept in an inactive, substantially vertical position. Next, as shown in FIG. 5, the intestines is gripped by the gripping member 3 and the guide member is brought into an active, substantially horizontal position by being pivoted about the horizontal axle 40. The axle 40 is preferably substantially parallel to the direction of travel of the viscera conveyor, so that the guide member comes in around the intestines from the side and from below, the intestines passing into the elongated opening of the guide member. This swinging or pivoting motion is initiated by the activation mechanism 48, which is acting on the arm 45 (see FIGS. 1 and 2) and which may be driven by hydraulics or gas, but activation by means for example of an electromotor is also possible.

At the same time as the movement of the guide member, the intestines may be stretched by a downwards movement of the gripping member and/or by the upwards movement of the guide member and/or by an upwards movement of the viscera holder. The gripping member may be activated simultaneously with the pivoting of the guide member, but it may also be advantageous to activate the gripping member and possibly inflict a downwards pull on the intestines before activating the guide member.

Here the gripping member 3 is illustrated as a tong-like tool with a pair of rods 31 on one side of the intestines and a single rod 32 on the other side pressing against each other to fixate the intestines, but other embodiments are possible as will be readily imaginable to the skilled person.

When the guide member 4 has been swung to its active position as in FIG. 5, the liver 16 and gizzard 17 are resting on the upper separation support surface 41, 42 of the guide member.

A stretching of the intestines 15, either by the gripping member 3, possibly in cooperation with the viscera holder and/or the guide member, or by gravity alone, causes the gallbladder 18, which was previously hidden underneath the liver, to pass through the elongated opening 43 in the guide member and become exposed on the underside of the guide member. In the case shown in FIG. 6 the spleen has also come through the elongated opening, but this will usually not be the case when using a guide member as in FIG. 1.

When the viscera set is in the position shown in FIG. 6, the gallbladder 18 and the spleen 19 can be separated from the remaining parts of the viscera set together with the intestines 15, for example by means of a rotating blade 5 arranged substantially in parallel with the underside of the guide member. It is, however, also possible to use other types of cutters or to simply pull the intestines and gallbladder off, even though pulling involves an increased risk of rupturing the gallbladder and/or damaging the liver. Another option is to use a guide member with two parts 41, 42 as described with reference to FIG. 2, but where the two parts can be brought close together so that the intestines and gallbladder are either fixated so that they may be pulled off, possibly using the gripping member, or cut off directly by the two parts acting as scissors.

The swinging of the guide member allows the liver 16 and gizzard 17 to slide downwards along the opening 43, whereby the gallbladder 18 is loosened from the liver and the viscera set turns into an optimal position for separation. This sliding movement may be simply under the influence of gravity, but it is also possible to cause a slightly oscillating movement by moving the viscera holder 2 and guide member 4 in relation to each other, thereby facilitating the reorientation of the liver, gizzard and gallbladder. The reorientation of the liver and gizzard on the separation support surface also means that they are arranged in a well-defined manner, which may be advantageous for a later separation of these from each other and from the remaining parts of the viscera set.

The gripping member 3 may actively pull on the intestines 15 or simply fixate them, such that an upwards movement of the guide member causes the intestines to be stretched. In the embodiment in the drawing, the intestines are arranged vertically, but it may prove advantageous to arrange them in a direction, which is substantially perpendicular to the separation support surface 41, 42. The direction of the intestines may also be changed during the process by changing the mutual position of the gripping member and guide member and/or the angle of one or both of them. The force applied to stretch the intestines may also change, potentially resulting in an oscillating movement of the intestines. The exact angles and forces resulting in an optimal positioning of the intestines 15, gallbladder 18 and liver 16 in relation to the guide member 4 will depend on numerous factors such as the angle of the separation support surface 41, 42, the size and shape of the opening 43 and the nature of the viscera sets being processed.

A single cut through all of the tissue connecting the intestines 15, the gallbladder 18 and possibly the spleen 19 to the rest of the viscera set will provide a very precise separation, but an even greater precision with reduced waste of liver tissue and less ruptured gallbladders may be achieved by performing two consecutive cuts: A first or pre-cut separates the intestines and surrounding connective tissue, fat and membranes from the gizzard, and a second or main cut separates the gallbladder from the liver, possibly also cutting loose the spleen.

The pre-cut results in the weight of the intestines and any pulling force applied by the gripping member to affect only the connections to the liver, resulting in the gall bladder being pulled out from the liver tissue and thus exposing the string of tissue connecting them. The second cut can thus be performed with a considerably reduced risk of cutting into the liver or gallbladder.

When processing chicken viscera sets the depth of the pre-cut should be approximately 7 mm and it has been found optimal to pull the intestines approximately 2 cm further down after the pre-cut for further exposure of the gallbladder.

Though the two separate steps for separating the intestines from gizzard and the gallbladder from the liver have been described above as being performed by cutting it will be understood that one or both of them might also be performed in other ways, for example by pulling. Likewise it will be understood that one or more cuts may be made using other means that the circular blade 5 shown, such as for example a linear blade or a pair of blades acting as scissors.

The gripping member 3 and guide member 4 may be mounted on an assembly frame including a pair of rods (not shown) projecting through openings 61, 62 as will be described in detail below. Such rods may be attached to a carrousel type processing station as is well known to the skilled person, thereby allowing the guide assembly to travel alongside an overhead viscera conveyor, the rods being substantially vertical. If the conveyor turns at the carrousel with a radius of curvature corresponding substantially to the radius of the carrousel, the guide assembly and viscera holders on the conveyors will travel substantially in parallel over a section of the conveyor.

The gripping member 3 is adapted to be attached to the rods via a first base member 63 and the guide member 4 is adapted to be attached to the same rods via a second similar base member 64. A wheel 65 on the back side of the second base member is adapted for travelling in a guide track 75 on the apparatus as shown in FIG. 6 and similar guide tracks 76, 77, 79 are provided for the other wheels 36, 37, 49, (see FIG. 4) respectively. When the guide track has an upwards inclination, the wheel and hence also the base member will be forced upwards, the base member sliding up along the rods, and vice versa when the guide track has a downwards inclination as is well known from other processes in poultry slaughter-houses. The first base member is provided with a similar wheel 36, but it is to be understood that both may be stationary or that the first may be moveable and the second stationary. Additional wheels 37, 49 are provided for controlling the angle of the base members. Any of these embodiments will provide the mutual change of position of the gripping member and the guide member described above.

The gripping member 3 here includes a U-shaped brace member 31 and a rod member 32 as described above. Both the brace member and the rod member are mounted on arms, which are again connected to the first base member 63 in a pivoting manner.

In the embodiment in FIGS. 4-6 the guide member is substantially horizontal in its active position, put it will be understood that this need not be the case. Any angle between 45 degrees and horizontal may be suitable for supporting the liver and gizzard depending amongst other things on the presence of edge flanges and if the intestines are held by a gripper or not. Likewise it is also possible to turn it over the horizontal plane so that the liver and gizzard will slide towards the distal end of the elongated opening. This possibility for arranging the guide member in a different angle also applies to other embodiments as far as the guide member is able to support the liver and the gizzard properly.

It is noted that though the invention has here been described with reference to embodiments having both a guide member and a gripping member, the gripping member might in principle be arranged apart from the guide assembly at an earlier stage in the processing of the birds, or even dispensed with, simply relying on gravity to pull the intestines down. This also implies that the guide member may be designed independently of the design of the gripping member and vice versa and that the combinations described above are therefore only to be regarded as non-limiting examples.

Figure 7:
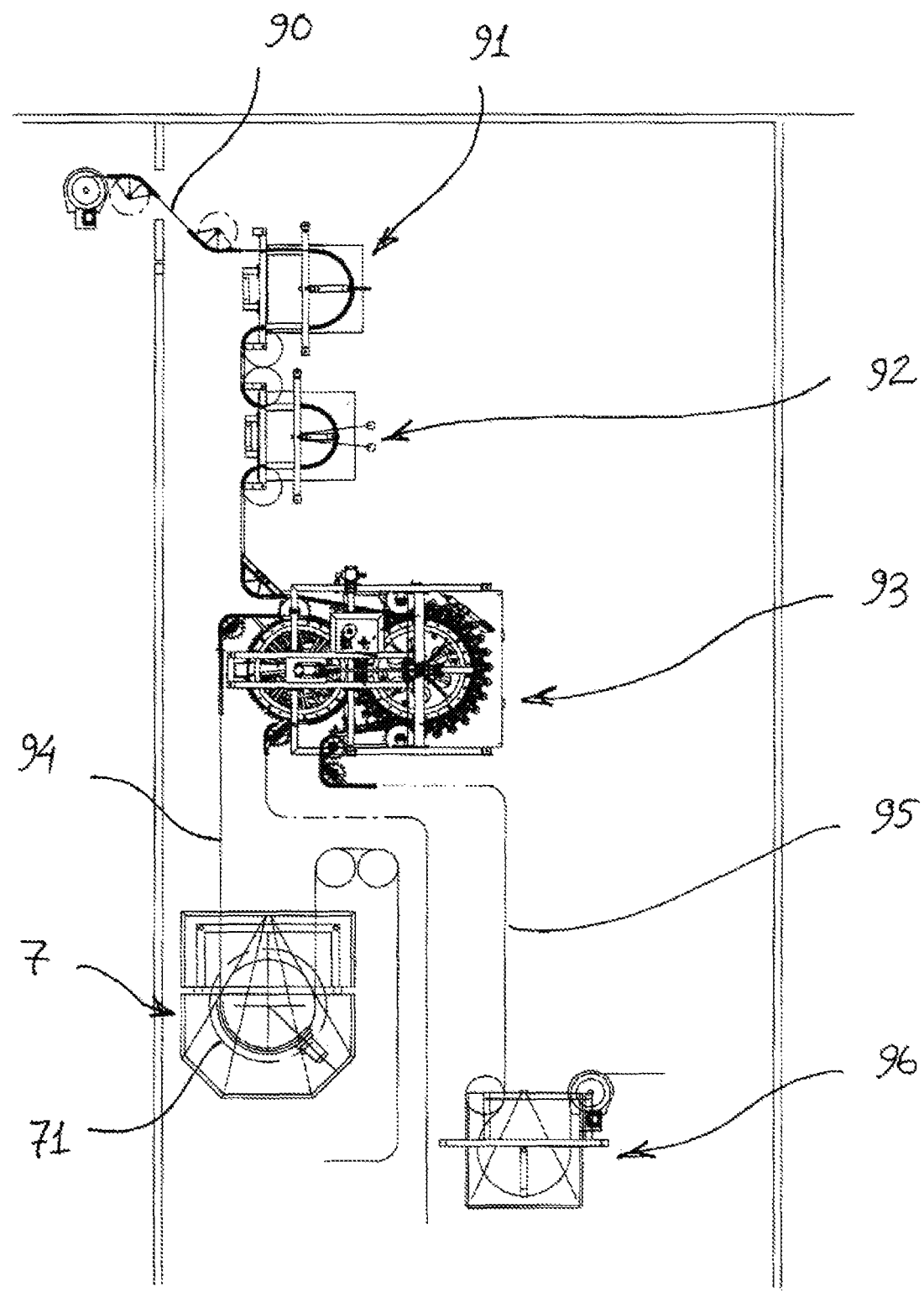
FIG. 7 is a schematic illustration of the layout of a section of a poultry slaughter house including a system according to the invention.

The guide member is part of a system 7 for separating viscera sets eviscerated from slaughtered poultry and this system in turn is intended for use in a poultry slaughter house, where it is arranged in series with other poultry processing systems. An example of the layout of a section of a poultry slaughter house including a system 7 according to the invention is shown in FIG. 7. Poultry (not shown), which has previously been stunned or killed and hung from the legs on an overhead conveyor 90, enters this section of the slaughter house at the upper left-hand corner in FIG. 7. From here the birds are first taken to a vent cutter 91 and then to an opening machine 92, before being eviscerated in an eviscerator 93. The viscera sets (not shown in FIG. 7) are conveyed away from the eviscerator on a viscera conveyor 94 to the system 7 according to the invention, while the carcasses are conveyed on a separate conveyor 95 to a cropping station 96. Further processing stations of known types may be provided further downstream on the viscera and carcass conveyors, but are not shown or described here.

The viscera set separating system 7 is here of the carrousel type with guide assemblies 6 distributed evenly along its periphery 71. The guide assemblies are arranged at the same mutual distance as the distance between viscera holders 2 on the viscera conveyor 94 and the carrousel is running at substantially the same speed as the conveyor. When passing the separating system 7 the viscera conveyor 94 performs a 180 degree turn, meaning that the viscera holders on the conveyor and the guide assemblies on the separating system run in parallel over approximately half the circumference of the carrousel. The fact that the guide assemblies move together with the viscera holder means that the impacts resulting from a moving viscera set on a viscera conveyor meeting a stationary guide assembly are avoided. It will, however, be understood that the invention will also work in poultry slaughterhouses having a different layout, and that the function of the guide member is in principle independent of the design of the rest of the system.

The invention claimed is:

1. A guide member for use in a system for separating viscera sets eviscerated from slaughtered poultry, said guide member comprising: a separation support surface having an elongated opening for receiving a viscera set so that at least the intestines and the gallbladder are suspended below said guide member and the liver and gizzard are positioned above said guide member, wherein the guide member has a front edge adapted for first coming into contact with the viscera set, and in that said elongated opening is provided in and extends away from the front edge of the separation support surface, and said elongated opening has a proximal section located at the front edge and a distal section located away from the front edge, the distal section of the opening being off-set in relation to the proximal section in a direction substantially parallel to the front edge.

2. The guide member according to claim 1, wherein the separation support surface includes two edges delimiting the elongated opening at least one of which is curved or bent in a plane defined by the separation support surface, the proximal and distal sections of the elongated opening being substantially perpendicular to the front edge and interconnected by an intermediate inclined section, which is arranged at an angle of 10-80 degrees to the front edge.

3. The guide member according to claim 1, wherein the guide member has side edges and at least one of the front and side edges of the guide member includes flanges extending upwards from the separation support surface.

4. A guide assembly including a guide member according to claim 1, wherein the guide member is moveable between an inactive position and an active position, the separation support surface being substantially vertical in the inactive position and substantially horizontal in the active position.

5. The guide assembly according to claim 4, wherein the guide member is pivotable about an axis that is at least one of substantially perpendicular to the elongated opening and parallel to the front edge.

6. The guide assembly according to claim 4, further comprising a gripping member arranged below said guide member for gripping a part of the intestines.

7. The guide assembly according to claim 6, further comprising an assembly frame on which at least one of the guide member and the gripping member are arranged.

8. The guide member according to claim 1, wherein the intermediate inclined section is arranged at an angle of 20-60 degrees to the front edge.

9. The guide member according to claim 1, wherein the intermediate inclined section is arranged at approximately 40 degrees to the front edge.

10. A system for separating viscera sets eviscerated from slaughtered poultry, said system comprising:
   a guide member according to claim 1; and
   a viscera conveyor comprising a plurality of viscera holders, wherein each viscera holder is configured to hold a viscera set so that at least the liver, the intestines, and the gallbladder are suspended below said viscera holder;
   wherein said guide member is configured to receive a viscera set, held by one of the viscera holders in said elongated opening so that the intestines and the gallbladder are suspended below said guide member and the liver and gizzard are positioned above said guide member;
   wherein said system is configured to separate the intestines and the gallbladder from the remaining viscera set; and
   wherein the guide member is pivotable about a horizontal axis, said system being configured to separate the intestines and the gallbladder from the remaining viscera set while at least said liver rests on a separation support surface of said guide member.

11. The system according to claim 10, wherein the system further comprises a plurality of gripping members, wherein each gripping member is configured to move with a particular viscera holder and grip a first part of the intestines, while the guide member is held in an inactive position.

12. A method for separating a viscera set eviscerated from slaughtered poultry and held by a viscera holder on a viscera conveyer so that at least the liver, the intestines and the gallbladder are suspended below said viscera holder, said method comprising the steps of:

arranging said viscera set in an elongated opening of a guide member so that the intestines and the gallbladder are suspended below said guide member and the liver and gizzard are positioned above said guide member;

separating the intestines and the gallbladder from the remaining viscera set;

moving the guide member during at least one of the arranging and separating steps, for causing at least one of the intestines and gallbladder to first enter a proximal section of the elongated opening located at a front edge of the guide member and then enter a distal section located away from the front edge, the distal section of the opening being off-set in relation to the proximal section in a direction substantially parallel to the front edge; and separating the intestines and the gallbladder from the rest of the viscera set while at least said liver rests on a separation support surface of said guide member.

13. The method according to claim 12, further comprising gripping the intestines by a gripping member before or simultaneously with the step of arranging said viscera set in said elongated opening of said guide member.

14. The method according to claim 12, wherein the separating step includes at least one of: separating the intestines and the gallbladder and possibly the spleen from the remaining viscera set by:

cutting with a blade positioned below said guide member;

cutting with edges of the elongated opening of the guide member moved together like scissors; and pulling on at least one of the intestines and gallbladder.

15. The method according to claim 12, including the following sequence of steps:

gripping the intestines using a gripping member;

pivoting the guide member to arrange the viscera set in the elongated opening of the guide member;

separating the intestines from the gizzard;

forcing the gallbladder downwards in relation to the guide member by increasing the distance between the gripping member and the guide member; and separating the gallbladder from the parts of the viscera set arranged on the separating support surface.

* * * * *